(12) United States Patent
Kasai et al.

(10) Patent No.: US 12,473,878 B2
(45) Date of Patent: Nov. 18, 2025

(54) VESSEL PROPULSION APPARATUS, VESSEL, AND VESSEL ENGINE

(71) Applicant: YAMAHA HATSUDOKI KABUSHIKI KAISHA, Iwata (JP)

(72) Inventors: Shinya Kasai, Shizuoka (JP); Satoshi Kinowaki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 18/536,327

(22) Filed: Dec. 12, 2023

(65) Prior Publication Data

US 2024/0102434 A1    Mar. 28, 2024

Related U.S. Application Data

(62) Division of application No. 17/956,898, filed on Sep. 30, 2022, now abandoned.

(30) Foreign Application Priority Data

Nov. 15, 2021    (JP) ................................ 2021-185986

(51) Int. Cl.
    *F02M 35/10*      (2006.01)
    *F02B 29/04*      (2006.01)
    *F02B 61/04*      (2006.01)
    *F02M 35/16*      (2006.01)

(52) U.S. Cl.
    CPC ... *F02M 35/10078* (2013.01); *F02B 29/0406* (2013.01); *F02B 61/045* (2013.01); *F02M 35/167* (2013.01)

(58) Field of Classification Search
CPC .......... F02M 35/10078; F02M 35/167; F02M 35/10111; F02M 35/1007; F02B 29/0406; F02B 61/045
See application file for complete search history.

(56) References Cited

U.S. PATENT DOCUMENTS

| | | | | |
|---|---|---|---|---|
| 5,207,210 A | * | 5/1993 | Yamagata | F02F 1/4214 123/193.5 |
| 6,173,690 B1 | * | 1/2001 | Iriya | F02B 23/104 123/301 |
| 6,196,185 B1 | * | 3/2001 | Jingu | F02F 1/242 123/41.82 R |

FOREIGN PATENT DOCUMENTS

JP      3591141 B2 * 11/2004 ................ F02F 3/26

OTHER PUBLICATIONS

Kasai et al., "Vessel Propulsion Apparatus, Vessel, and Vessel Engine", U.S. Appl. No. 17/956,898, filed Sep. 30, 2022.

* cited by examiner

*Primary Examiner* — Syed O Hasan
(74) *Attorney, Agent, or Firm* — Keating & Bennett, LLP (57) ABSTRACT

A vessel propulsion apparatus includes an engine and a propulsion unit to be driven by the engine. The engine includes a cylinder head including a combustion chamber and a pair of intake openings to communicate with the combustion chamber. The engine further includes a pair of intake ports respectively including a pair of downstream portions respectively connected to the pair of intake openings. A distance between the pair of downstream portions decreases toward the pair of intake openings.

3 Claims, 6 Drawing Sheets

VESSEL PROPULSION APPARATUS, VESSEL, AND VESSEL ENGINE

CROSS REFERENCE TO RELATED APPLICATIONS

This application claims the benefit of priority to Japanese Patent Application No. 2021-185986 filed on Nov. 15, 2021. The entire contents of this application are hereby incorporated herein by reference.

BACKGROUND OF THE INVENTION

1. Field of the Invention

The present invention relates to a vessel propulsion apparatus, a vessel, and a vessel engine.

2. Description of the Related Art

US 2002/0072281A1 discloses an outboard motor that is an example of a vessel propulsion apparatus. An engine for use in the outboard motor includes a cylinder block provided with a plurality of cylinders, a piston disposed in each of the cylinders, and a cylinder head connected to the cylinder block. Combustion concave portions, which form a combustion chamber together with corresponding cylinders and pistons, are provided one by one at a portion, which faces each of the cylinders, of the cylinder head. A pair of intake valve openings and an exhaust valve opening are formed in each of the combustion concave portions. A pair of intake ports that extend from an intake manifold are connected to the pair of intake valve openings, respectively. An exhaust port is connected to the exhaust valve opening. With respect to intake/exhaust in the each of the cylinders, air that has flowed into the intake manifold divides and flows into the pair of intake ports, and then flows from the pair of intake valve openings into the combustion chamber, and then is combusted together with fuel in the combustion chamber, and, as a result, turns into an exhaust gas, and then flows through the exhaust valve opening and the exhaust port, and then is discharged outwardly from the outboard motor.

SUMMARY OF THE INVENTION

In a vessel propulsion apparatus, such as the outboard motor disclosed by US 2002/0072281A1, it is necessary to consider a so-called co swirl caused by air that has flowed from the pair of intake valve openings into the combustion chamber in the engine. The co swirl is a swirl making an co-shaped trace seen from a moving direction of the piston in such a manner that air that has flowed into the combustion chamber from each of the pair of intake valve openings flows toward the exhaust valve opening so that a distance between the flows of air becomes longer immediately after entering into the combustion chamber and then decreases while the flows of air are approaching each other. If it is possible to prevent the occurrence of the co swirl, it is possible to improve engine performance by increasing a combustion speed.

The inventor of preferred embodiments of the present invention described and claimed in the present application conducted an extensive study and research regarding a vessel propulsion apparatus, a vessel, and a vessel engine, such as the one described above, and in doing so, discovered and first recognized new unique challenges and previously unrecognized possibilities for improvements as described in greater detail below.

Preferred embodiments of the present invention provide vessel propulsion apparatuses each able to prevent the occurrence of an co swirl in a combustion chamber of an engine, vessels including the vessel propulsion apparatuses, and vessel engines included in the vessel propulsion apparatuses.

In order to overcome the previously unrecognized and unsolved challenges described above, a preferred embodiment of the present invention provides a vessel propulsion apparatus including an engine and a propulsion unit to be driven by the engine. The engine includes a cylinder head including a combustion chamber and a pair of intake openings to communicate with the combustion chamber and a pair of intake ports respectively connected to the pair of intake openings. The pair of intake ports include a pair of downstream portions respectively connected to the pair of intake openings. A distance between the pair of downstream portions decreases toward the pair of intake openings.

With this structural arrangement, in the engine of the vessel propulsion apparatus, air divides and flows into the pair of intake ports, flows into the combustion chamber from the pair of intake openings, and is combusted in the combustion chamber together with fuel. Thus, the engine generates a driving force, the propulsion unit is driven in the vessel propulsion apparatus, and therefore the vessel propulsion apparatus generates a thrust. The distance between the downstream portions connected to the intake openings of the pair of intake ports decreases toward the intake openings, and therefore air immediately after having flowed into the combustion chamber from the pair of intake openings is able to flow so that the distance between each other does not increase. This makes it possible to prevent the occurrence of an co swirl in the combustion chamber of the engine.

In a preferred embodiment of the present invention, the vessel propulsion apparatus further includes a pressure charger and an intercooler to cool air compressed by the pressure charger. Air cooled by the intercooler flows into the pair of intake ports. The pair of intake ports include a pair of independent intake ports that individually extend from the intercooler to the pair of intake openings.

With this structural arrangement, as each of the pair of intake ports is an independent intake port, it is possible to easily arrange the distance between the downstream portions connected to the intake openings so as to decrease in proportion as the downstream portions approach the intake openings.

A preferred embodiment of the present invention provides a vessel propulsion apparatus including an engine and a propulsion unit to be driven by the engine. The engine includes a cylinder head including a combustion chamber and a pair of intake openings to communicate with the combustion chamber and a pair of intake ports respectively connected to the pair of intake openings. The cylinder head includes a pair of inner surfaces that respectively extend from peripheral edges of the pair of intake openings and that face each other in an arrangement direction in which the pair of intake openings are arranged. The combustion chamber is defined between the pair of inner surfaces. The pair of inner surfaces include a pair of upstream portions respectively connected to the peripheral edges of the pair of intake openings. A distance between the pair of upstream portions decreases in a direction moving away from the peripheral edges of the pair of intake openings.

With this structural arrangement, in the engine of the vessel propulsion apparatus, air divides and flows into the pair of intake ports, flows into the combustion chamber from the pair of intake openings, and is combusted in the combustion chamber together with fuel. Thus, the engine generates a driving force, the propulsion unit is driven in the vessel propulsion apparatus, and therefore the vessel propulsion apparatus generates a thrust. In the pair of inner surfaces that respectively extend from the peripheral edges of the pair of intake openings in the cylinder head and that face each other across the combustion chamber in an arrangement direction of the pair of intake openings, the distance between the pair of upstream portions connected to the peripheral edges of the intake openings decreases in the direction moving away from the peripheral edge of the intake openings. Therefore, air immediately after having flowed into the combustion chamber from the pair of intake openings is able to flow so that the distance between the air flows does not increase. This makes it possible to prevent the occurrence of an ω swirl in the combustion chamber of the engine.

In a preferred embodiment of the present invention, the cylinder head includes a pair of exhaust openings to communicate with the combustion chamber and arranged side by side along the arrangement direction. The engine includes a pair of exhaust ports respectively connected to the pair of exhaust openings. A first inner surface of the pair of inner surfaces connects a peripheral edge of a first intake opening of the pair of intake openings and a peripheral edge of a first exhaust opening of the pair of exhaust openings. A second inner surface of the pair of inner surfaces connects a peripheral edge of a second intake opening of the pair of intake openings and a peripheral edge of a second exhaust opening of the pair of exhaust openings. The first inner surface and the second inner surface are curved toward each other.

With this structural arrangement, the distance between the upstream portions in the pair of inner surfaces of the cylinder head decreases in the direction moving away from the peripheral edges of the intake openings.

In a preferred embodiment of the present invention, the engine includes a crankshaft extending along a vertical direction. The vessel propulsion apparatus is an outboard motor that includes a drive shaft, a propeller shaft, a propeller, and a transmission. The drive shaft is joined to the crankshaft, and extends along the vertical direction. The propeller shaft extends along a horizontal direction. The propeller defines the propulsion unit, and is joined to the propeller shaft. The transmission transmits rotation of the drive shaft to the propeller shaft.

With this structural arrangement, in the outboard motor, the rotation of the crankshaft of the engine is transmitted to the propeller shaft through the drive shaft and the transmission, and, as a result, the propeller shaft rotates together with the propeller, and therefore the propeller generates a thrust. In the combustion chamber of the engine of the outboard motor, it is possible to prevent the occurrence of an ω swirl as described above.

A preferred embodiment of the present invention provides a vessel including a hull and the vessel propulsion apparatus mounted in the hull to provide a thrust to the hull.

With this structural arrangement, in the combustion chamber of the engine of the vessel propulsion apparatus included in the vessel, it is possible to prevent the occurrence of an ω swirl as described above.

A preferred embodiment of the present invention provides a vessel engine including a cylinder head including a combustion chamber, a pair of intake openings to communicate with the combustion chamber, and a pair of intake ports respectively connected to the pair of intake openings. The pair of intake ports include a pair of downstream portions respectively connected to the pair of intake openings. A distance between the pair of downstream portions decreases toward the pair of intake openings.

With this structural arrangement, in the combustion chamber of the vessel engine, it is possible to prevent the occurrence of an ω swirl as described above.

A preferred embodiment of the present invention provides a vessel engine including a cylinder head including a combustion chamber, a pair of intake openings to communicate with the combustion chamber, and a pair of intake ports respectively connected to the pair of intake openings. The cylinder head includes a pair of inner surfaces that respectively extend from peripheral edges of the pair of intake openings and that face each other in an arrangement direction in which the pair of intake openings are arranged. The combustion chamber is defined between the pair of inner surfaces. The pair of inner surfaces include a pair of upstream portions respectively connected to the peripheral edges of the pair of intake openings. A distance between the pair of upstream portions decreases in a direction moving away from the peripheral edges of the pair of intake openings.

With this structural arrangement, in the combustion chamber of the vessel engine, it is possible to prevent the occurrence of an ω swirl as described above.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
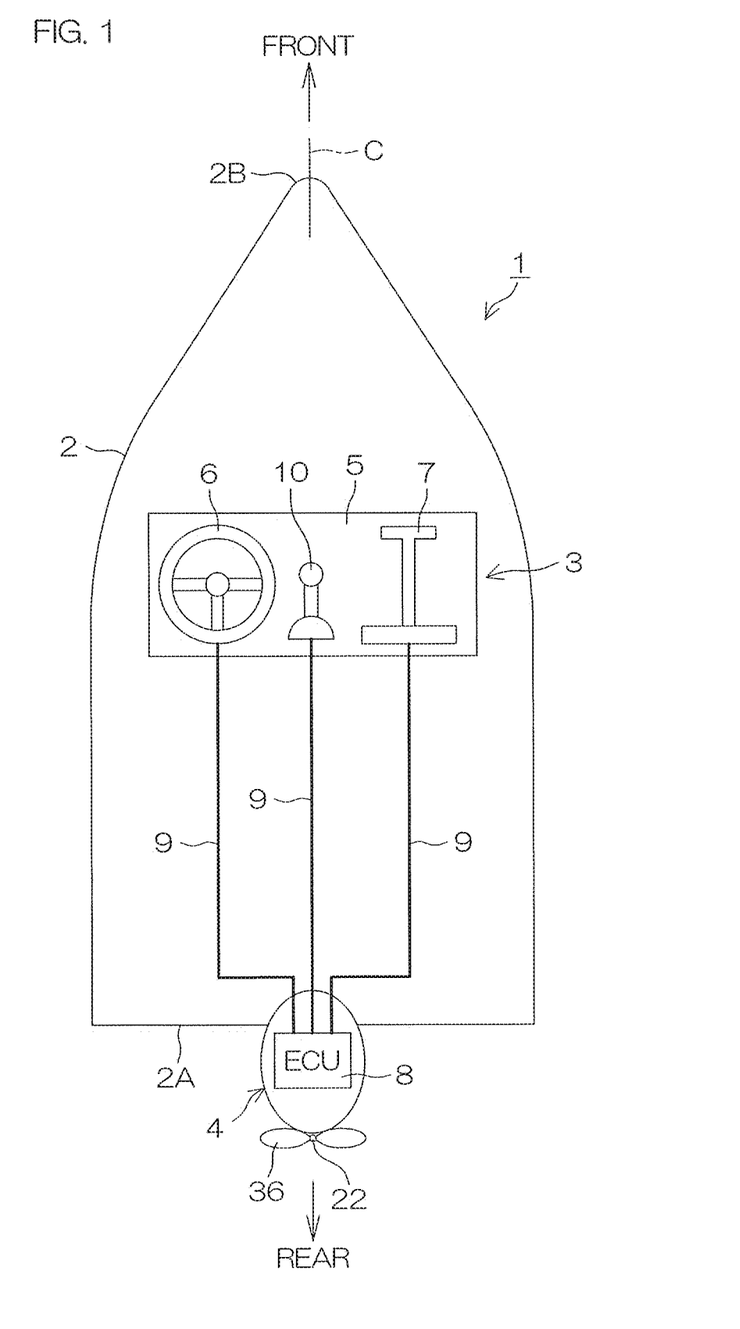
FIG. 1 is a schematic plan view of a vessel according to a preferred embodiment of the present invention.

FIG. 1 is a schematic plan view of a vessel 1 according to a preferred embodiment of the present invention. The vessel 1 includes a hull 2, a vessel operation device 3, and an outboard motor 4, and the hull 2 is equipped with both the vessel operation device 3 and the outboard motor 4. An example of the vessel operation device 3 includes a steering wheel 6 and a throttle lever 7 both of which are provided at an operational platform 5 around a vessel operation seat of the hull 2, and a communication bus 9 by which an ECU (electronic control unit) 8 built into the outboard motor 4, a steering wheel 6, and the throttle lever 7 are connected together. A vessel operator turns the steering wheel 6 in a left-right direction to steer. The vessel operator turns the throttle lever 7 in a front-rear direction to adjust the output of the outboard motor 4. A joystick 10 that is operated by the vessel operator to steer and adjust the output of the outboard motor 4 may be provided at the operational platform 5.

The outboard motor 4 is an example of a vessel propulsion apparatus that provides a thrust to the hull 2, and is provided as a single outboard motor or as a plurality of outboard motors. The single outboard motor 4 is attached to a transom stern 2A on a virtual center line C along the front-rear direction through the transom stern 2A and a bow 2B of the hull 2. The plurality of outboard motors 4 are attached to the transom stern 2A at bilaterally symmetrical positions with respect to the center line C.

Figure 2:
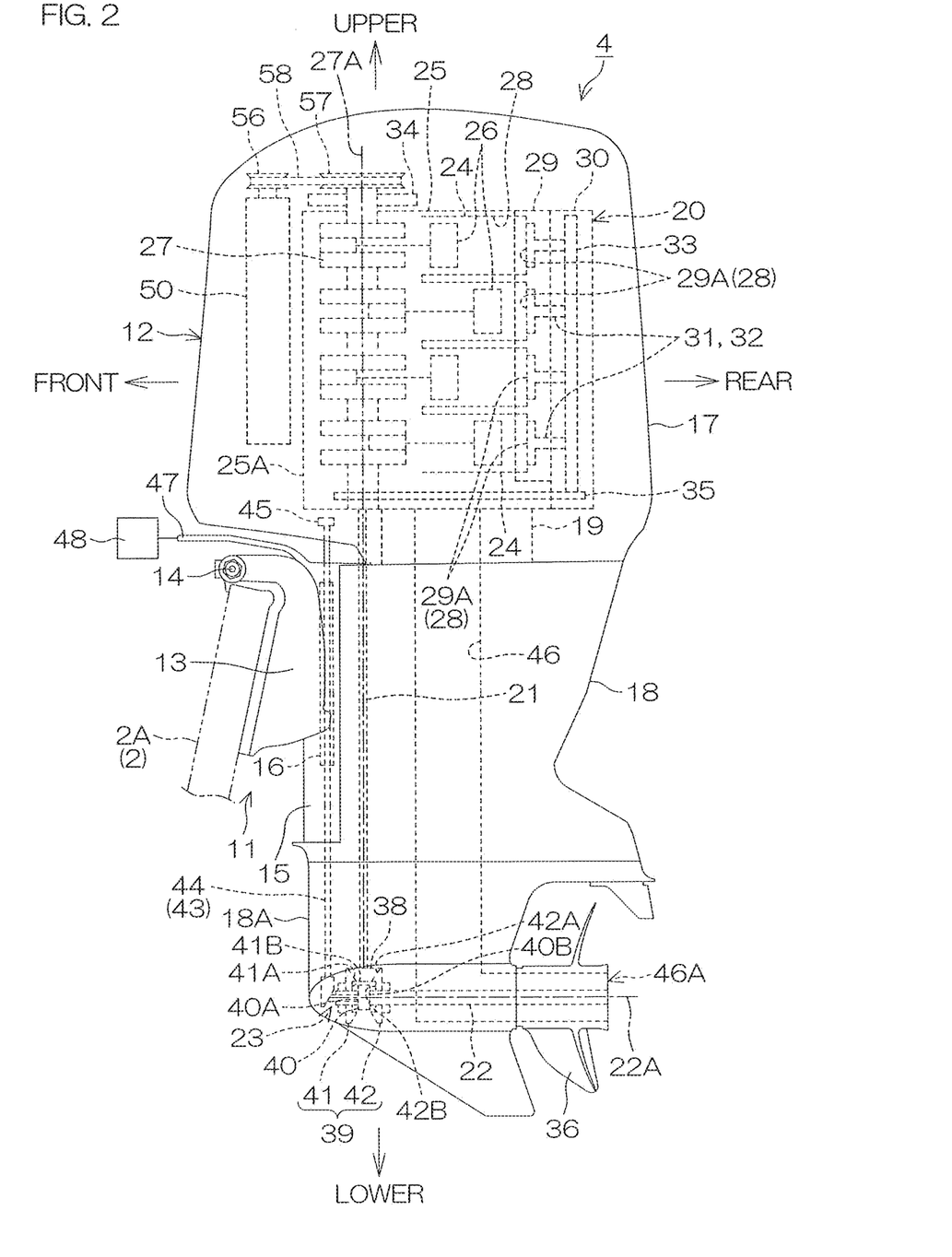
FIG. 2 is a schematic side view of an outboard motor included in the vessel.

FIG. 2 is a schematic right side view of the outboard motor 4. The left side in FIG. 2 is the front side of the outboard motor 4, and the right side in FIG. 2 is the rear side of the outboard motor 4. The upper side in FIG. 2 is the upper side of the outboard motor 4, and the lower side in FIG. 2 is the lower side of the outboard motor 4. An up-down direction is also a vertical direction. A direction perpendicular to the plane of paper of FIG. 2 is the left-right direction of the outboard motor 4. In the following description, a leftward or rightward direction of the outboard motor 4 is determined based on a direction given when the outboard motor 4 is seen from the front side. Therefore, the near side in the direction perpendicular to the plane of paper of FIG. 2 is the right side of the outboard motor 4, and the far side in the direction perpendicular to the plane of paper of FIG. 2 is the left side of the outboard motor 4.

The outboard motor 4 includes a mount 11 to attach the outboard motor 4 to the transom stern 2A and an outboard motor main body 12. The mount 11 includes a clamp bracket 13 fixed to the transom stern 2A and a swivel bracket 15 coupled to the clamp bracket 13 through a tilt shaft 14 horizontally extending in the left-right direction. The swivel bracket 15 is coupled to the outboard motor main body 12 through a steering shaft 16 extending in the up-down direction. Thus, the outboard motor main body 12 is attached to the transom stern 2A by the mount 11 in a vertical or substantial vertical attitude.

The outboard motor main body 12 and the swivel bracket 15 are turnable in the up-down direction around the tilt shaft 14 with respect to the clamp bracket 13. The outboard motor main body 12 is turned around the tilt shaft 14, and, as a result, the outboard motor main body 12 is tilted with respect to the hull 2 and the clamp bracket 13. The outboard motor main body 12 is turnable in the left-right direction together with the steering shaft 16 with respect to the clamp bracket 13 and the swivel bracket 15. When the outboard motor main body 12 turns in the left-right direction, the vessel 1 is steered.

The outboard motor main body 12 includes a box-shaped engine cover 17, a hollow casing 18 extending downwardly from the engine cover 17, and a plate-shaped exhaust guide 19 attached to a lower end portion of the engine cover 17 so as to close an internal space of the casing 18 from above. A lower end portion of the casing 18 is a lower case 18A. The outboard motor main body 12 includes an engine 20 mounted on an upper surface of the exhaust guide 19 in the engine cover 17, a drive shaft 21 extending along the up-down direction in the casing 18, and a propeller shaft 22 and a transmission 23 both of which are located in the lower case 18A.

The engine 20 is a vessel engine, and includes an internal combustion engine that burns fuel, such as gasoline, and generates power. The engine 20 includes a cylinder block 25 including a single or a plurality of cylinders 24, a piston 26 located in the cylinder 24 one by one, and a crankshaft 27 extending along the up-down direction in the cylinder block 25 and that is coupled to the piston(s) 26. The engine 20 in the present preferred embodiment is a straight-type four-cylinder engine in which four cylinders 24 are located in series along the up-down direction.

An internal space of each of the cylinders 24 includes a circular cylindrical shape extending along the front-rear direction. A combustion chamber 28 is defined in a region behind the piston 26 in the internal space of each of the cylinders 24. A front portion that houses the crankshaft 27 in the cylinder block 25 is a crank case 25A.

The engine 20 includes a cylinder head 29 attached to the cylinder block 25 from behind and a head cover 30 attached to the cylinder head 29 from behind. The cylinder head 29 and the head cover 30 may be regarded as elements of the cylinder block 25. Concave portions 29A each of which is rearwardly hollowed as a portion of the combustion chamber 28 are provided one by one at a portion, which faces the combustion chamber 28 of each of the cylinders 24, of a front surface of the cylinder head 29. The engine 20 includes an intake valve 31 and an exhaust valve 32 that are exposed to each of the concave portions 29A and a camshaft 33 that extends along the up-down direction and that is rotatably supported by the head cover 30. The camshaft 33 may be provided as a pair of camshafts in accordance with each of the intake valve 31 and the exhaust valve 32.

The crankshaft 27 has a crankshaft axis 27A extending in the up-down direction. An upper end portion of the crankshaft 27 protrudes upwardly from the crank case 25A. A lower end portion of the crankshaft 27 is joined to the upper end portion of the drive shaft 21. The engine 20 includes a flywheel magneto 34 fixed to the upper end portion of the crankshaft 27 and a cam chain 35 connecting the lower end portion of the crankshaft 27 and a lower end portion of the camshaft 33. The flywheel magneto 34 is located at a higher position than the crank case 25A. The cam chain 35 is located below the four cylinders 24 in the cylinder block 25.

The piston 26 is rectilinearly reciprocated in the front-rear direction perpendicular to the crankshaft axis 27A by combustion of an air-fuel mixture in each of the combustion chambers 28. When the piston 26 is rectilinearly reciprocated, the crankshaft 27 is driven and rotated around the crankshaft axis 27A along with the drive shaft 21. In accordance with the rotation of the crankshaft 27, the flywheel magneto 34 rotates and generates electricity, and the cam chain 35 moves in a circular motion. The camshaft 33 is rotated in accordance with the circular movement of the cam chain 35. The intake valve 31 and the exhaust valve 32 are actuated interlockingly with the rotation of the camshaft 33. Thus, intake/exhaust is performed in each of the combustion chambers 28.

The propeller shaft 22 horizontally extends along the front-rear direction in the lower case 18A. A lower end portion of the drive shaft 21 is coupled to a front end portion of the propeller shaft 22 by the transmission 23. A rear end portion of the propeller shaft 22 protrudes rearwardly from the lower case 18A. A propeller 36 as an example of a propulsion unit that is an element of the outboard motor 4 is joined to the rear end portion of the propeller shaft 22. The propeller shaft 22 rotates together with the propeller 36 around a rotational axis 22A that extends in the front-rear direction.

The transmission 23 is used to transmit the rotation of the drive shaft 21 to the propeller shaft 22. The transmission 23 includes a driving gear 38 fixed to the lower end portion of the drive shaft 21 and a rotary body 39 and a dog clutch 40 both of which are attached to the front end portion of the propeller shaft 22. The driving gear 38 is a bevel gear. The propeller shaft 22 is located below the driving gear 38. The rotary body 39 includes a first rotary body 41 and a second rotary body 42 that are located side by side in the front-rear direction along the propeller shaft 22. The first rotary body 41 and the second rotary body 42 are, for example, cylindrical bevel gears, respectively.

In the present preferred embodiment, the first rotary body 41 is located at a more forward position than the driving gear 38, and the second rotary body 42 is located at a more rearward position than the driving gear 38, and yet the front-rear positional relationship between the first rotary body 41 and the second rotary body 42 may be opposite to that of the present preferred embodiment. In a rear surface of the first rotary body 41, a tooth portion 41A is provided at a tapered outer peripheral portion, and a claw portion 41B is provided at an inner peripheral portion. In a front surface of the second rotary body 42, a tooth portion 42A is provided at a tapered outer peripheral portion, and a claw portion 42B is provided at an inner peripheral portion.

The first rotary body 41 surrounds a portion, which is at a more forward position than the driving gear 38, of the front end portion of the propeller shaft 22, and the second rotary body 42 surrounds a portion, which is at a more rearward position than the driving gear 38, of the front end portion of the propeller shaft 22. The first rotary body 41 and the second rotary body 42 are located so that their tooth portions 41A and 42A face each other at a distance from each other in the front-rear direction, and engage with the driving gear 38. When the driving gear 38 rotates together with the drive shaft 21 in response to the driving of the engine 20, the rotation of the driving gear 38 is transmitted to the first rotary body 41 and to the second rotary body 42. Thus, the first rotary body 41 and the second rotary body 42 rotate around the rotational axis 22A of the propeller shaft 22 in mutually opposite directions.

The dog clutch 40 is located between the first rotary body 41 and the second rotary body 42. The dog clutch 40 is, for example, cylindrical, and surrounds the front end portion of the propeller shaft 22. A first claw portion 40A is provided at a front end surface of the dog clutch 40, and a second claw portion 40B is provided at a rear end surface of the dog clutch 40. The dog clutch 40 is coupled to the front end portion of the propeller shaft 22 by, for example, a spline. Therefore, the dog clutch 40 rotates together with the front end portion of the propeller shaft 22. Additionally, the dog clutch 40 is movable in the front-rear direction with respect to the front end portion of the propeller shaft 22. In other words, the dog clutch 40 is rotatable together with the propeller shaft 22, and is movable along the front-rear direction relatively with the propeller shaft 22.

The transmission 23 also includes a shifter 43 located at a more forward position than the propeller shaft 22 in the lower case 18A. The shifter 43 includes, for example, a shift rod 44 extending in the up-down direction and an electric shift actuator 45 joined to the shift rod 44. A lower end portion of the shift rod 44 is coupled to the dog clutch 40. When the shift actuator 45 is operated by the control of the ECU 8 (see FIG. 1), the shift rod 44 turns around an axis of the shift rod 44. The shift rod 44 turns, and, as a result, the dog clutch 40 is moved along the front-rear direction between a disconnection position and a connection position.

The disconnection position is a position in which the dog clutch 40 is spaced apart from the first rotary body 41 and the second rotary body 42, and does not engage with either of these rotary bodies of the rotary body 39 as shown in FIG. 2. In a state in which the dog clutch 40 is located in the disconnection position, each of the rotary body 39 to which the rotation of the drive shaft 21 is transmitted runs idle, and therefore the rotation of the drive shaft 21 is not transmitted to the propeller shaft 22. In the following description, the shift position of the outboard motor 4 at this time is referred to as "neutral."

The connection position is a position in which the dog clutch 40 engages with either one of the first rotary body 41 or the second rotary body 42. The connection position includes a first connection position in which the first claw portion 40A of the dog clutch 40 engages with only the claw portion 41B of the first rotary body 41 and a second connection position in which the second claw portion 40B of the dog clutch 40 engages with only the claw portion 42B of the second rotary body 42. The disconnection position is a position between the first connection position and the second connection position. The first connection position is more forward than the disconnection position, and the second connection position is more rearward than the disconnection position.

In a state in which the dog clutch 40 is located in the first connection position and is coupled to only the first rotary body 41, the rotation of the first rotary body 41 is transmitted to the propeller shaft 22, and therefore the shift position of the outboard motor 4 is shifted into "forward." Thereupon, the rotation of the drive shaft 21 is transmitted to the propeller shaft 22 through the first rotary body 41 and the dog clutch 40, and, as a result, the propeller 36 rotates in a forward rotational direction (for example, a clockwise direction when seen from the rear side). Thus, the propeller 36 is driven by the engine 20, and a forward thrust is generated.

In a state in which the dog clutch 40 is located in the second connection position and is coupled to only the second rotary body 42, the rotation of the second rotary body 42 is transmitted to the propeller shaft 22, and therefore the shift position of the outboard motor 4 is shifted into "reverse." Thereupon, the rotation of the drive shaft 21 is transmitted to the propeller shaft 22 through the second rotary body 42 and the dog clutch 40, and, as a result, the propeller 36 rotates in a reverse rotational direction opposite to the forward rotational direction. Thus, the propeller 36 is driven by the engine 20, and a reverse thrust is generated. As thus described, in the present preferred embodiment, the first rotary body 41 is a gear for forward movement, and the second rotary body 42 is a gear for reverse movement. Of course, the first rotary body 41 may be a gear for reverse movement, and the second rotary body 42 may be a gear for forward movement.

The outboard motor main body 12 includes an exhaust passage 46 provided inside the outboard motor main body 12 and connected to the engine 20. The exhaust passage 46 passes through the exhaust guide 19 in the up-down direction, and extends downwardly in the casing 18 and rearwardly in the propeller 36. The exhaust passage 46 includes an outlet 46A provided at a rear end surface of the propeller 36. In a state in which the vessel 1 is floating on water and in which the propeller 36 is located below a water surface, the outlet 46A is located in the water, and therefore water that has passed through the outlet 46A enters a downstream portion of the exhaust passage 46. On the other hand, when the engine 20 rotates at a high speed, water in the exhaust passage 46 is pushed by the pressure of an exhaust gas emitted from the engine 20, and is discharged from the outlet 46A together with the exhaust gas. Thus, the exhaust gas generated by the engine 20 is discharged into the water.

A steering rod 47 that forwardly extends is fixed to the outboard motor main body 12. An electric steering actuator 48 that is controlled by the ECU 8 is joined to the steering rod 47. The outboard motor main body 12 is able to turn around the steering shaft 16 by allowing the steering actuator 48 to operate, thus making it possible to perform steering.

Figure 3:
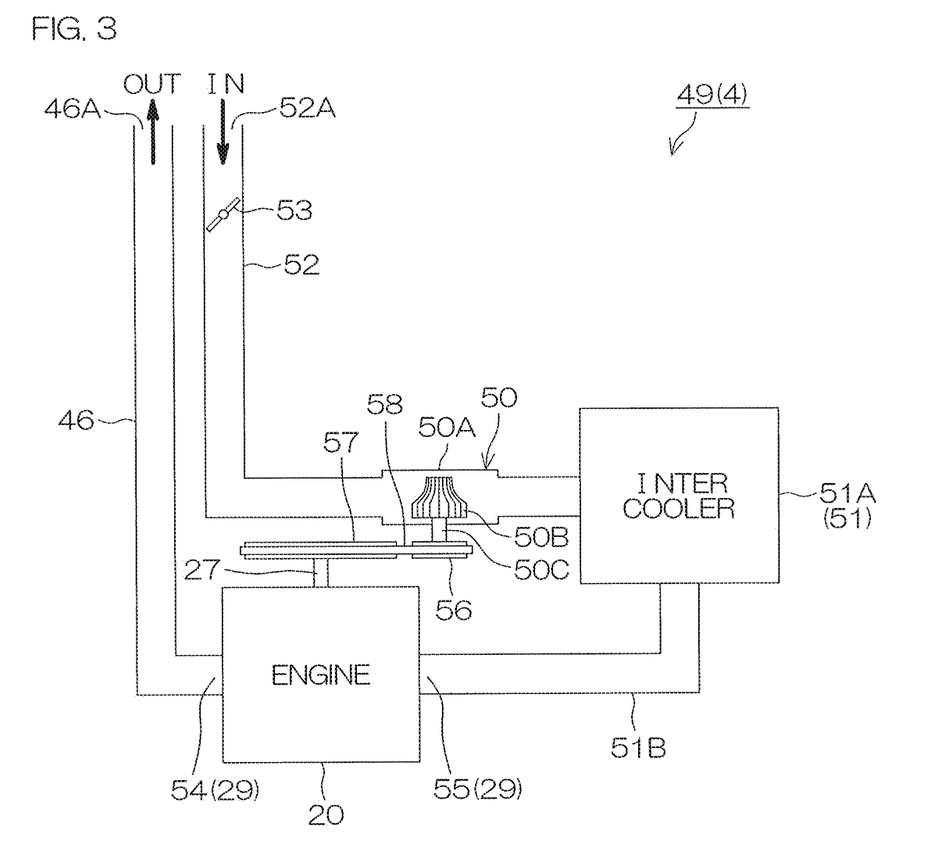
FIG. 3 is a schematic view shown to describe an air intake/exhaust system of the outboard motor.

FIG. 3 is a schematic view shown to describe an air intake/exhaust system 49 of the outboard motor 4. The air intake/exhaust system 49 includes the engine 20, a pressure charger 50 that compresses air and supplies the air to the engine 20, and an intercooler 51 that cools air compressed by the pressure charger 50.

With respect to the air intake/exhaust system 49, the engine 20 includes the exhaust passage 46, an air intake passage 52, and an electric throttle valve 53 located in the air intake passage 52. The exhaust passage 46 is connected to each of the combustion chambers 28 through a plurality of exhaust ports 54 provided in the cylinder head 29 of the engine 20. The air intake passage 52 is connected to each of the combustion chambers 28 through a plurality of intake ports 55 provided in the cylinder head 29. An inlet 52A is provided at an end portion, which is opposite to the intake port 55, of the air intake passage 52. The ECU 8 controls the throttle valve 53, and, as a result, the opening degree of the throttle valve 53 is adjusted.

The pressure charger 50 is interposed between the ends of the air intake passage 52. The pressure charger 50 is a supercharger driven by the rotation of the crankshaft 27 of the engine 20. The pressure charger 50 includes a housing 50A including an internal space defining a portion of the air intake passage 52, a compressor wheel 50B located in the housing 50A, and a rotational shaft 50C coaxially fixed to the compressor wheel 50B. An end portion, which is spaced apart from the compressor wheel 50B, of the rotational shaft 50C is located outside the housing 50A, and a rotor 56 is coaxially fixed to this end portion.

The air intake/exhaust system 49 includes a power transmission by which the crankshaft 27 and the pressure charger 50 are joined together. An example of the power transmission includes the rotor 56, another rotor 57 attached to the crankshaft 27, and a belt 58 by which the rotor 56 and the rotor 57 are connected together. An example of each of the rotors 56 and 57 is a pulley. The rotor 57 is attached to a portion, which is located at a higher position than the flywheel magneto 34, of the upper end portion of the crankshaft 27 (see FIG. 2).

When the crankshaft 27 rotates, the rotor 57 rotates together with the crankshaft 27. The rotation of the rotor 57 is transmitted to the rotor 56 through the belt 58. Thereupon, the rotational shaft 50C rotates together with the compressor wheel 50B, and, as a result, the pressure charger 50 is driven. A sprocket may be used as each of the rotors 56 and 57 instead of the pulley, and a chain may be used instead of the belt 58.

When the pressure charger 50 operates in a state in which the throttle valve 53 has been opened, air that has been taken from the inlet 52A and that flows through the air intake passage 52 is compressed by the compressor wheel 50B rotating in the housing 50A. Another arrangement, such as a Lysholm-type device, may be used as the pressure charger 50 without being limited to the centrifugal-type device shown in FIG. 3.

The intercooler 51 is interposed between each of the intake ports 55 of the engine 20 and the pressure charger 50 in the air intake passage 52. The intercooler 51 includes a housing 51A including an internal space defining a portion of the air intake passage 52 and a cooling fin (not shown). Either of an air-cooled intercooler or a water-cooled intercooler may be used as the intercooler 51. The intercooler 51 includes an intake manifold 51B that extends from the housing 51A and is connected to the intake port 55. The intake manifold 51B is integral with the housing 51A.

Air compressed by the compressor wheel 50B in the housing 50A of the pressure charger 50 continuously flows through the air intake passage 52, and thus is guided to the intercooler 51, and is cooled by heat exchange with the cooling fin in the housing 51A of the intercooler 51. The air cooled by the intercooler 51 flows through the intake manifold 51B, and then is turned into an air-fuel mixture, supplied from the intake port 55 to the combustion chamber 28 in the cylinder 24, and combusted. Exhaust gas generated by the combustion flows from the exhaust port 54 through the exhaust passage 46, and then is discharged from the outlet 46A into the water as described above.

Figure 4:
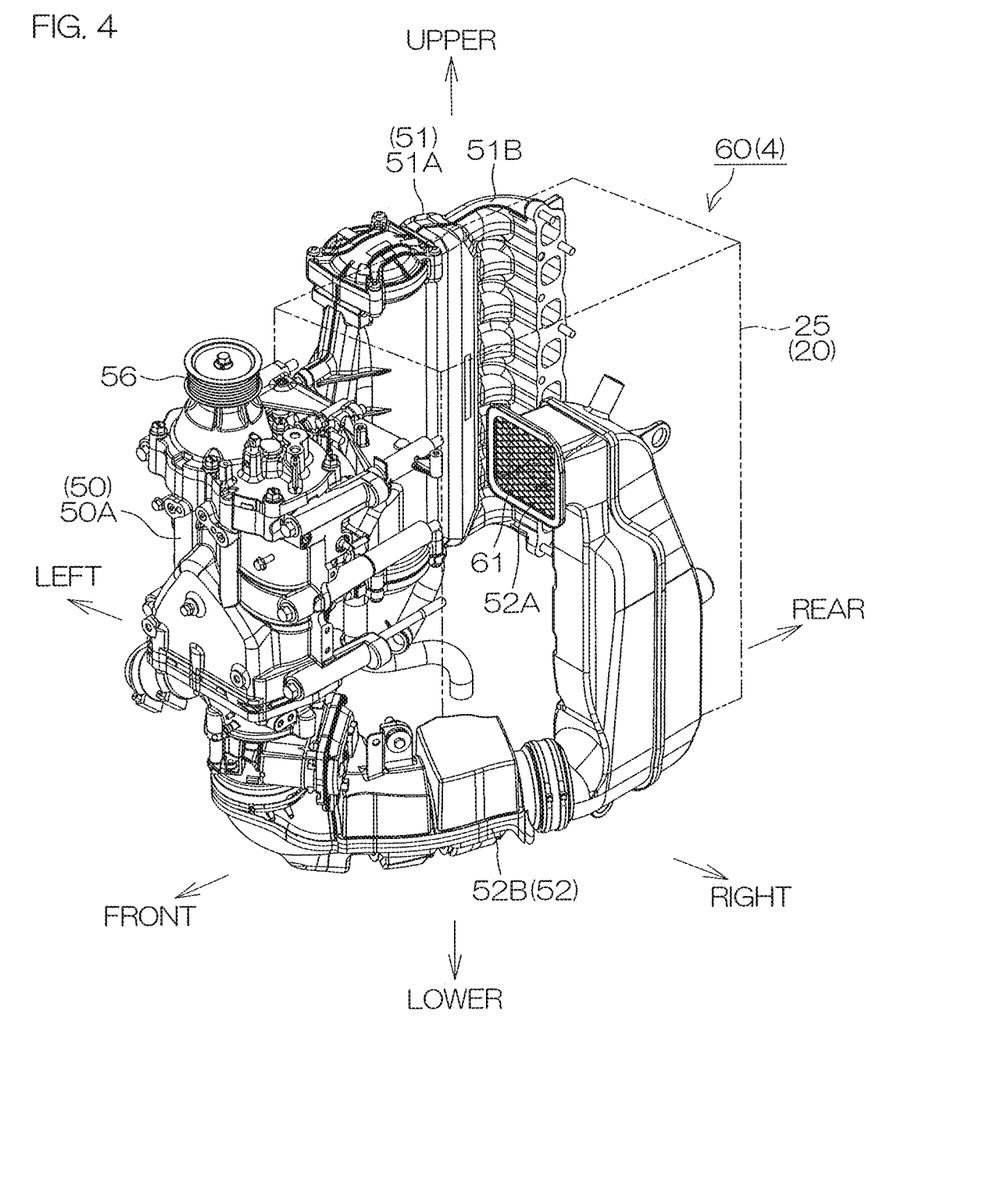
FIG. 4 is a perspective view of an air intake structure in the air intake/exhaust system.

FIG. 4 is a perspective view of an air intake structure 60, seen from the right front side, which excludes the exhaust passage 46 in the air intake/exhaust system 49. The intercooler 51 is located lateral to (more specifically, on the left side of) the cylinder block 25 of the engine 20. The housing 51A of the intercooler 51 is made of metal, such as aluminum, and is a hollow body elongated in the up-down direction. The intake manifold 51B integral with the housing 51A extends rearwardly from the housing 51A, and is bent rightwardly.

The pressure charger 50 is located in front of the cylinder block 25. An upstream region 52B, that is closer to the inlet 52A than the pressure charger 50, of the air intake passage 52 extends downwardly from the housing 50A of the pressure charger 50, and then extends right-rearwardly, and is bent on the right side of the cylinder block 25, and extends upwardly. The inlet 52A is provided at an upper end portion of the upstream region 52B and faces forwardly. A filter 61 made of mesh, etc., is provided at the inlet 52A. A portion, which is located on the right side of the cylinder block 25, of the upstream region 52B may be referred to as an air intake duct. The rotor 56 is located at an upper surface of the housing 50A of the pressure charger 50.

Figure 5:
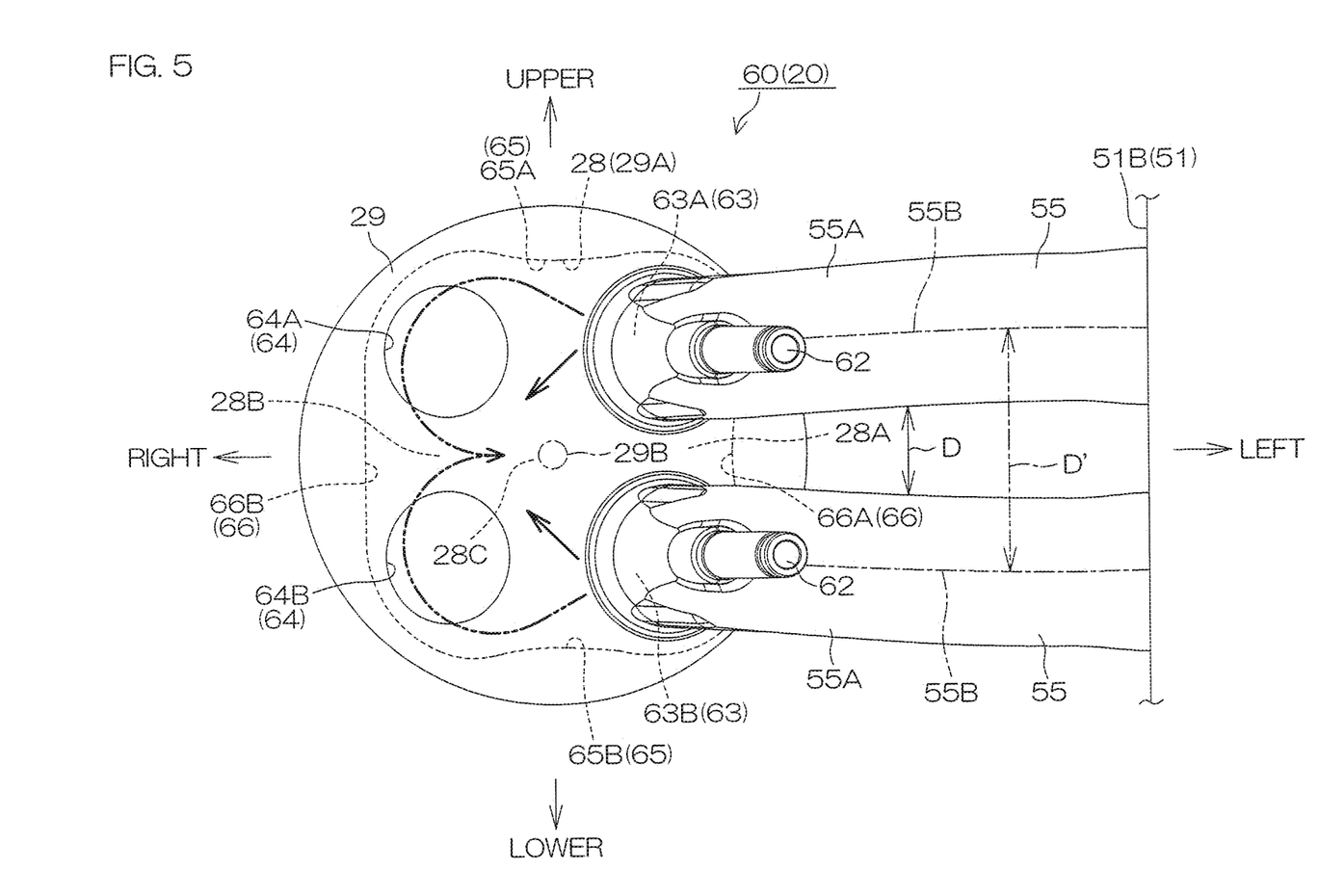
FIG. 5 is a rear view of a main portion in the air intake structure.

FIG. 5 is a rear view of a main portion of the air intake structure 60. A portion of the cylinder head 29 and a pair of the intake ports 55 are shown in FIG. 5. The concave portion 29A, i.e., a portion of the combustion chamber 28 is provided at the cylinder head 29 as a single or a plurality of concave portions whose number is the same as the number of cylinders 24, and, in the present preferred embodiment, four concave portions 29A are arranged side by side in the up-down direction (see FIG. 2). The intake port 55 is a circular tubular pipe passage provided as a pair for each combustion chamber 28, and extends rightwardly from the intake manifold 51B (in a rear view, leftwardly), and is connected to a corresponding combustion chamber 28. A valve guide 62 that supports the intake valve 31 (see FIG. 2) is provided at each of the intake ports 55. The intake valve 31 and the exhaust valve 32 are omitted and are not shown in FIG. 5 and in the drawings subsequent to FIG. 5. The exhaust port 54 is a circular tubular pipe passage provided as a pair for each combustion chamber 28 (see FIG. 6).

A pair of air intake openings 63 and a pair of exhaust openings 64 are provided in a region, which coincides with each of the combustion chambers 28 in a rear view, of a rear surface of the cylinder head 29. Each of the air intake opening 63 and the exhaust opening 64 is a round hole that passes through the cylinder head 29 in the front-rear direction or substantially in the front-rear direction (see also FIG. 6). A single intake valve 31 is located in a single air intake opening 63, and a single exhaust valve 32 is located in a single exhaust opening 64 (not shown). A through-hole 29B that exposes an ignition plug (not shown) to each of the combustion chambers 28 is also provided in the cylinder head 29.

An arrangement relative to each of the combustion chambers 28 will be hereinafter described with reference to a single combustion chamber 28. For the air intake opening 63 and the exhaust opening 64 corresponding to the single combustion chamber 28, the pair of air intake openings 63 arranged side by side along the up-down direction are located on the left side (in a rear view, on the right side) closer to the intake manifold 51B than the pair of exhaust openings 64 arranged side by side along the up-down direction. In other words, in the present preferred embodiment, an arrangement direction in which the pair of air intake openings 63 are arranged is the up-down direction (the arrangement direction), and an arrangement direction in which the pair of exhaust openings 64 are arranged is likewise the up-down direction (the arrangement direction).

The pair of air intake openings 63 communicate with a first region 28A, which occupies substantially a left half of the combustion chamber 28, from behind, and the pair of exhaust openings 64 communicate with a second region 28B, which occupies substantially a right half of the combustion chamber 28, from behind. A region surrounded by the pair of air intake openings 63 and by the pair of exhaust openings 64 in a rear view is a central region 28C of the combustion chamber 28. The central region 28C is a boundary region between the first region 28A and the second region 28B. The through-hole 29B is located at a position that coincides with the central region 28C in a rear view.

In the following description, an upper one of the pair of air intake openings 63 will be referred to as a first air intake opening 63A if necessary, and a lower one of the pair of air intake openings 63 will be referred to as a second air intake opening 63B if necessary. Additionally, an upper one of the pair of exhaust openings 64, i.e., the exhaust opening 64 located on the first air intake opening 63A side in the up-down direction will be referred to as a first exhaust opening 64A if necessary, and a lower one of the pair of exhaust openings 64, i.e., the exhaust opening 64 located on the second air intake opening 63B side in the up-down direction will be referred to as a second exhaust opening 64B if necessary.

A pair of intake ports 55 are respectively connected to the pair of air intake openings 63 communicating with the single combustion chamber 28. A pair of exhaust ports 54 are respectively connected to the pair of exhaust openings 64 communicating with this combustion chamber 28 (see FIG. 6).

Each of the pair of intake ports 55 is an independent intake port that individually extends from the intake manifold 51B integral with the intercooler 51 to the air intake opening 63. A portion, which is connected to the air intake opening 63, i.e., a portion closer to the air intake opening 63, of each of the pair of intake ports 55, is referred to as a downstream portion 55A. A distance D between the downstream portions 55A of the pair of intake ports 55 decreases toward the air intake opening 63.

A virtual line passing through the center of the intake port 55 (more specifically, the center in a flow-passage cross section of the intake port 55) is referred to as a tube axis 55B. A distance D' between the tube axes 55B in the downstream portions 55A of the pair of intake ports 55 likewise decreases toward the air intake opening 63 in the same way as the distance D between the downstream portions 55A. A distance between the entire areas of the pair of intake ports 55 may also become shorter toward the air intake opening 63 without being limited to the distance D between the downstream portions 55A.

Air cooled by the intercooler 51 divides and flows into each of the pair of intake ports 55 in the engine 20 of the outboard motor 4. The air that has been divided and flowed into each of the pair of intake ports 55 flows into a corresponding one of the combustion chambers 28 from each of the pair of air intake openings 63, and is combusted in the combustion chamber 28 together with fuel. Thus, the engine 20 generates a driving force, and the propeller 36 is driven in the outboard motor 4, and therefore the outboard motor 4 generates a thrust.

In the pair of intake ports 55, the distance D between the downstream portions 55A connected to the air intake openings 63 decreases toward the air intake openings 63 as described above. This arrangement enables air immediately after having flowed into the combustion chamber 28 from each of the pair of air intake openings 63 to flow toward the central region 28C side of the combustion chamber 28 (i.e., toward the ignition plug exposed through the through-hole 29B) so that the distance between the air flows does not increase (see the thick solid arrow in FIG. 5). This makes it possible to prevent the occurrence of an ω swirl (see the thick alternate long and two short dashed line arrow in FIG. 5) in the combustion chamber 28 of the engine 20. If the occurrence of an ω swirl is prevented, it is possible to prevent the occurrence of knocking, and it is possible to raise a combustion speed particularly during ignition advance, thus making it possible to improve the performance of the engine 20. Additionally, if each of the pair of intake ports 55 is an independent intake port, it is possible to easily arrange the distance D between the downstream portions 55A connected to the air intake openings 63 so as to become shorter toward the air intake openings 63.

Figure 6:
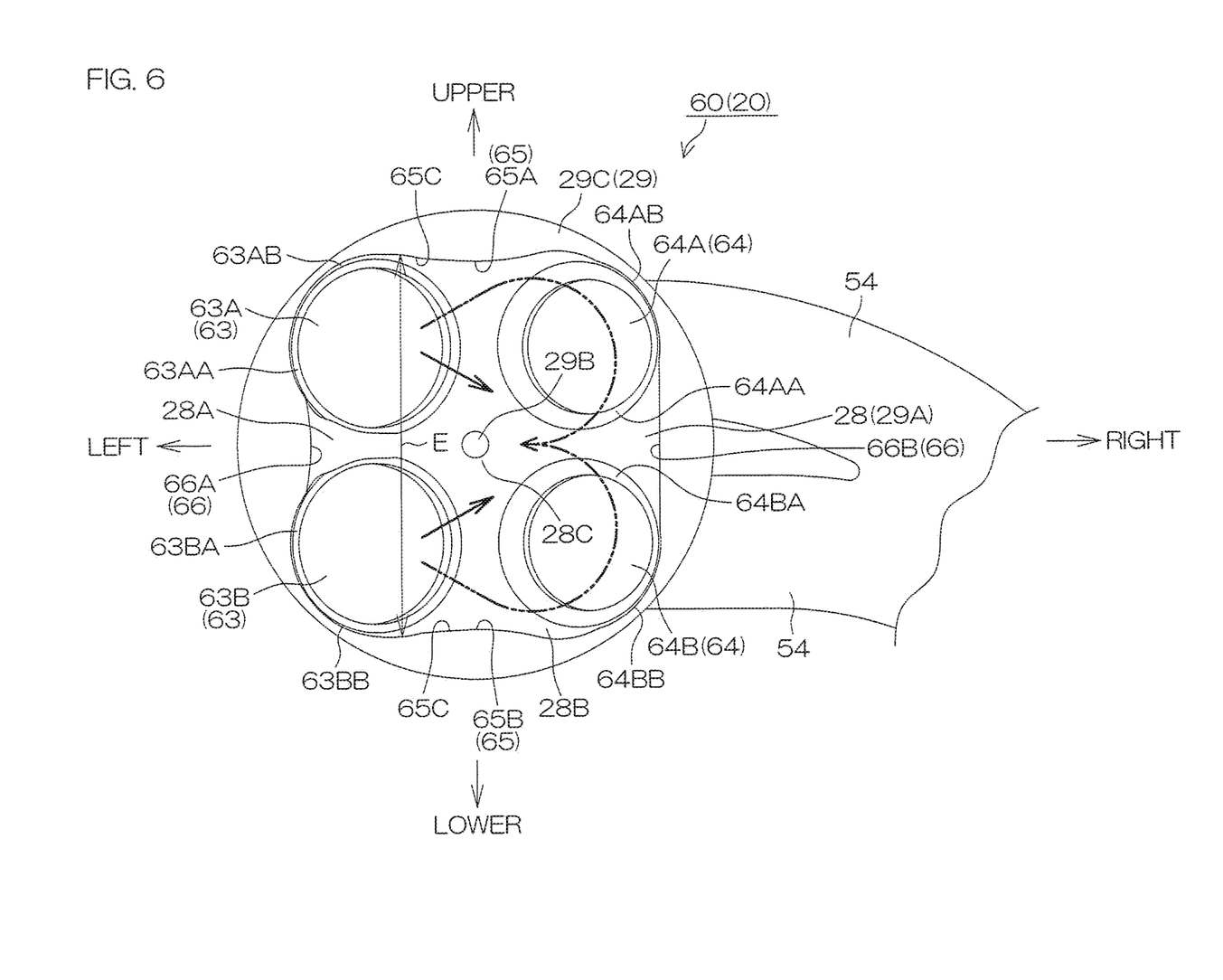
FIG. 6 is a front view of the main portion in the air intake structure.

FIG. 6 is a front view of a main portion of the air intake structure 60. A portion of a front surface 29C, at which the combustion chamber 28 (concave portion 29A) is provided, of the cylinder head 29 and the pair of exhaust ports 54 are shown in FIG. 6. The pair of exhaust ports 54 extend rightwardly.

A pair of inner surfaces 65 facing each other in an arrangement direction in which the pair of air intake openings 63 are arranged (in the present preferred embodiment, in the up-down direction) and another pair of inner surfaces 66 facing each other in the left-right direction perpendicular to the arrangement direction are provided for each of the combustion chambers 28 in the cylinder head 29.

In the following description, an upper inner surface 65, which is located on the first air intake opening 63A side in the up-down direction, of the pair of inner surfaces 65 will be referred to as a first inner surface 65A if necessary, and a lower inner surface 65, which is located on the second air intake opening 63B side in the up-down direction, of the pair of inner surfaces 65 will be referred to as a second inner surface 65B if necessary. Additionally, a left inner surface 66, which is located on the pair of air intake ports 63 side in the left-right direction, of the pair of inner surfaces 66 will be referred to as a first inner surface 66A if necessary, and a right inner surface 66, which is located on the pair of exhaust openings 64 side in the left-right direction, of the pair of inner surfaces 66 will be referred to as a second inner surface 66B if necessary.

Left ends of the pair of inner surfaces 65 are provided between the first inner surfaces 66A, and right ends of the pair of inner surfaces 65 are provided between the second inner surfaces 66B. The single combustion chamber 28 is defined between the pair of inner surfaces 65 and between the pair of inner surfaces 66. The combustion chamber 28 includes a rectangular or substantially rectangular shape whose four corners are rounded in a front view. Either the pair of air intake openings 63 or the pair of exhaust openings 64 are located one by one at the four corners of the combustion chamber 28 in a front view.

A circular arc, by which a left end portion of the first inner surface 65A and an upper end portion of the first inner surface 66A are connected together, of a circular peripheral edge 63AA fringing the first air intake opening 63A is referred to as a peripheral edge 63AB. A circular arc, by which a left end portion of the second inner surface 65B and a lower end portion of the first inner surface 66A are connected together, of a circular peripheral edge 63BA fringing the second air intake opening 63B is referred to as a peripheral edge 63BB. A circular arc, by which a right end portion of the first inner surface 65A and an upper end portion of the second inner surface 66B are connected together, of a circular peripheral edge 64AA fringing the first exhaust opening 64A is referred to as a peripheral edge 64AB. A circular arc, by which a right end portion of the second inner surface 65B and a lower end portion of the second inner surface 66B are connected together, of a circular peripheral edge 64BA fringing the second exhaust opening 64B is referred to as a peripheral edge 64BB.

The first inner surface 65A connects the peripheral edge 63AB of the first air intake opening 63A and the peripheral edge 64AB of the first exhaust opening 64A together. The second inner surface 65B connects the peripheral edge 63BB of the second air intake opening 63B and the peripheral edge 64BB of the second exhaust opening 64B together. In other words, the pair of inner surfaces 65 extend from the peripheral edge 63AB and the peripheral edge 63BB of the pair of air intake openings 63 to the peripheral edge 64AB and the peripheral edge 64BB of the pair of exhaust openings 64, respectively.

A portion, which is connected to the peripheral edge 63AB or the peripheral edge 63BB of a corresponding air intake opening 63, of each of the pair of inner surfaces 65, i.e., a portion, which is substantially a left half closer to the air intake opening 63, of each of the pair of inner surfaces 65 is referred to an upstream portion 65C. The first inner surface 65A and the second inner surface 65B of the pair of inner surfaces 65 are curved so as to approach each other. Therefore, a distance E between the upstream portions 65C of the pair of inner surfaces 65 decreases in a direction moving rightwardly away from the peripheral edge 63AB and from the peripheral edge 63BB. Likewise, this arrangement enables air immediately after having flowed into the combustion chamber 28 from each of the pair of air intake openings 63 to flow so that the distance between each other does not increase (see the thick solid arrow in FIG. 6). This makes it possible to prevent the occurrence of an ω swirl (see the thick alternate long and two short dashed line arrow in FIG. 6) in the combustion chamber 28 of the engine 20. The pair of inner surfaces 66 may be curved so as to approach each other in the same way as the pair of inner surfaces 65, or may extend linearly in a parallel or substantially parallel manner, or one of the pair of inner surfaces 66 may be curved while the other inner surface 66 may extend linearly.

Preferred embodiments of the present invention have been described above, and yet the present invention is not limited to the contents of the above-described preferred embodiments, and various modifications can be made within the scope of the present invention.

For example, an arrangement in which the distance D decreases toward the air intake opening 63 (see FIG. 5) and an arrangement in which the distance E decreases in a direction moving away from the peripheral edge 63AB and the peripheral edge 63BB of the pair of air intake openings 63 (see FIG. 6) may be used in combination with each other, or only one of the arrangements may be used.

For example, the pressure charger 50 includes only the supercharger in the above-described preferred embodiments. The outboard motor 4 may be provided with a turbocharger (not shown) driven by exhaust gas passing through the exhaust passage 46. The pressure charger 50 may include only a turbocharger, or may include both a supercharger and a turbocharger.

Additionally, an inboard/outboard motor, or an inboard motor, or a waterjet drive may be used as an example of a vessel propulsion apparatus other than the outboard motor 4. In the inboard/outboard motor, a vessel engine arranged in the same way as the engine 20 is located inside the vessel, and a drive unit including a propulsion unit (propeller 36, etc.) and a steering assembly is located outside the vessel. The inboard motor is a vessel engine and a drive unit that are built into the hull 2 and in which the propeller 36 is attached to a propeller shaft extending from the drive unit and outwardly from the vessel. In this case, the steering assembly is separately provided. The waterjet drive is arranged to accelerate water taken in from a vessel bottom by a pump, and jet the water from a jet nozzle of a transom stern, and thus obtain a thrust. In this case, the pump is driven by the vessel engine, and the steering assembly includes the jet nozzle and a mechanism that turns the jet nozzle along a horizontal plane. In the vessel engine, a plurality of cylinders 24 may be located in series along the horizontal direction, etc., so that the crankshaft 27 extends in the front-rear direction.

Various features described above may be appropriately combined together.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vessel propulsion apparatus comprising:
   an engine including a cylinder head including:
      a combustion chamber;
      a pair of intake openings to communicate with the combustion chamber;
      a pair of inner surfaces respectively extending from peripheral edges of the pair of intake openings, facing each other in an arrangement direction in which the pair of intake openings are arranged, and defining the combustion chamber therebetween; and
      a pair of intake ports respectively connected to the pair of intake openings and including tube axes extending through centers of the pair of intake ports; and
   a propulsion unit to be driven by the engine; wherein
   the pair of inner surfaces include a pair of upstream portions respectively connected to the peripheral edges of the pair of intake openings, and a distance between the pair of upstream portions decreases in a direction moving away from the peripheral edges of the pair of intake openings; and
   a distance between the tube axes of the pair of intake ports decreases as the pair of intake ports extend toward the pair of intake openings;

each of the peripheral edges of the pair of intake openings includes a circular arc having an end portion directly connected to a corresponding one of the pair of upstream portions; and each of the pair of upstream portions extends directly from the end portion of the circular arc of a corresponding one of the peripheral edges of the pair of intake openings.

2. The vessel propulsion apparatus according to claim 1, wherein the cylinder head includes a pair of exhaust openings to communicate with the combustion chamber and arranged side by side along the arrangement direction;

the engine includes a pair of exhaust ports respectively connected to the pair of exhaust openings;

a first inner surface of the pair of inner surfaces connects a peripheral edge of a first intake opening of the pair of intake openings and a peripheral edge of a first exhaust opening of the pair of exhaust openings;

a second inner surface of the pair of inner surfaces connects a peripheral edge of a second intake opening of the pair of intake openings and a peripheral edge of a second exhaust opening of the pair of exhaust openings; and the first inner surface and the second inner surface are curved toward each other.

3. A vessel engine comprising:

a cylinder head including:

a combustion chamber;

a pair of intake openings to communicate with the combustion chamber;

a pair of inner surfaces that respectively extend from peripheral edges of the pair of intake openings, that face each other in an arrangement direction in which the pair of intake openings are arranged, and that define the combustion chamber therebetween; and a pair of intake ports respectively connected to the pair of intake openings and including tube axes extending through centers of the pair of intake ports; wherein the pair of inner surfaces include a pair of upstream portions respectively connected to the peripheral edges of the pair of intake openings, and a distance between the pair of upstream portions decreases in a direction moving away from the peripheral edges of the pair of intake openings;

a distance between the tube axes of the pair of intake ports decreases as the pair of intake ports extend toward the pair of intake openings;

each of the peripheral edges of the pair of intake openings includes a circular arc having an end portion directly connected to a corresponding one of the pair of upstream portions; and each of the pair of upstream portions extends directly from the end portion of the circular arc of a corresponding one of the peripheral edges of the pair of intake openings.

* * * * *